United States Patent Office 3,496,182
Patented Feb. 17, 1970

3,496,182
SUBSTITUTED 10- OR 11-PIPERAZINO DIBENZO-CYCLOHEPTADIENE DERIVATIVES
Jean Clement Louis Fouché, Bourg-la-Reine, France, assignor to Rhone-Poulenc S.A., Paris, France, a French body corporate
No Drawing. Filed Dec. 15, 1966, Ser. No. 601,849
Claims priority, application France, Dec. 28, 1965, 44,075, 44,076; Jan. 25, 1966, 47,206, 47,207, 47,208, 47,209
The portion of the term of the patent subsequent to Aug. 19, 1986, has been disclaimed
Int. Cl. C07d 51/70
U.S. Cl. 260—268                                   9 Claims

ABSTRACT OF THE DISCLOSURE

The invention provides novel 10- or 11-piperazinodibenzo-[a,d]cycloheptadienes substituted in one of the benzene nuclei, and their salts, which are useful as sedatives, tranquillizers, antihistaminics, antiserotinins, antiallergics, spasmolytics, and antiemetics.

This invention relates to dibenzo[a,d]cycloheptadiene derivatives and their preparation.

The invention provides the dibenzo[a,d]cycloheptadiene derivatives of the formula:

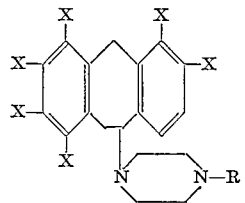

I and their acid addition salts and quaternary ammonium derivatives, in which one of the symbols X is halogen, cyano, trifluoromethyl, alkyl of 1 to 5 carbon atoms, alkoxy of 1 to 5 carbon atoms, alkylthio of 1 to 5 carbon atoms, alkanesulphinyl of 1 to 5 carbon atoms, or alkanesulphonyl of 1 to 5 carbon atoms, and the other symbols X are all hydrogen; R is hydrogen, alkyl of 1 to 5 carbon atoms, hydroxyalkyl of 1 to 5 carbon atoms, hydroxyalkoxyalkyl of 1 to 5 carbon atoms in each alkyl residue, alkenyl of 2 to 5 carbon atoms, alkynyl of 2 to 5 carbon atoms, phenyl, phenylalkyl of 1 to 5 carbon atoms in the alkyl residue, phenylalkenyl of 2 to 5 carbon atoms in the alkenyl residue, the aforesaid phenyl radicals being unsubstituted or substituted by one or more of halogen, alkyl of 1 to 5 carbon atoms, alkoxy of 1 to 5 carbon atoms, nitro, amino, and trifluoromethyl; and the carbon atoms of the piperazine nucleus may be substituted by one or more methyl groups.

According to a feature of the invention, the dibenzo [a,d]cycloheptadiene derivatives of Formula I are prepared by reacting an ester of the formula:

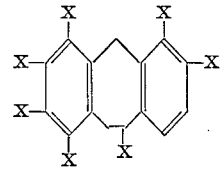

II with a piperazine of the formula:

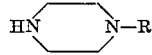

III in which Y is a reactive ester residue, such as a halogen atom or a sulphuric or sulphonic ester residue (for example a methanesulphonyloxy or toluene-p-sulphonyloxy residue), X and R are as defined above, and the carbon atoms of the piperazine nucleus may be substituted by one or more methyl groups, and optionally converting a base obtained into an acid addition salt or quaternary ammonium derivative thereof.

It is advantageous to carry out the operation in an inert organic solvent such as an aromatic hydrocarbon, preferably at the boiling temperature of the solvent, and to use as condensing agent an excess of the piperazine of Formula III.

According to a further feature of the invention, the dibenzo[a,d]cycloheptadiene derivatives of Formula I in which R is other than hydrogen or substituted or unsubstituted phenyl are prepared by reacting a dibenzo-[a,d]cycloheptadiene of the formula:

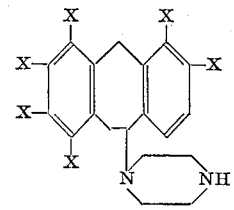

IV with an ester of the formula:

Y—R'          V in which X and Y are as defined above, R' is a radical other than hydrogen or substituted or unsubstituted phenyl, and within the definition of R as defined above, and the carbon atoms of the piperazine nucleus may be substituted by one or more methyl groups, and optionally converting a base obtained into an acid addition salt or quaternary ammonium derivative thereof.

It is advantageous to carry out the operation in an inert organic solvent such as ethanol, preferably at the boiling temperature of the solvent, and to use as condensing agent an excess of the compound of the Formula IV.

According to yet a further feature of the invention, the dibenzo[a,d]cycloheptadiene derivatives of Formula I in which one of the symbols X is alkanesulphinyl or alkanesulphonyl are prepared by oxidizing a said derivative of Formula I in which one of the symbols X is alkylthio or alkanesulphinyl and optionally converting a base obtained into an acid addition salt or quaternary ammonium derivative thereof. This oxidation may take place by the application of any known method of oxidizing a sulphide into a sulphoxide or a sulphone, for example with hydrogen peroxide in an acetic acid medium, or for oxidizing a sulphoxide into a sulphone (as the case may be).

The compounds of Formula II, which are new, may be prepared from the corresponding alcohols of the formula:

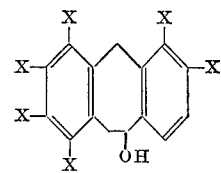

VI in which the symbols X are as previously defined, by known methods for preparing reactive esters from the corresponding alcohols.

The alcohols of Formula VI, which are also new, may be prepared by reducing the corresponding ketones of the formula:

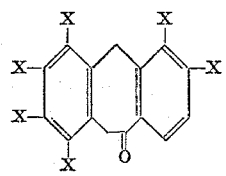

VII in which the symbols X are as previously defined. This reduction may be carried out by known methods of reducing ketones to alcohols more particularly by catalytic hydrogenation in the presence of Adams platinum or Raney nickel, or by the action of an alkali metal borohydride.

The ketones of Formula VII, which are new, may be prepared in the following ways.

(a) When one of the symbols X represents halogen, alkyl, alkoxy, alkylthio or trifluoromethyl, by cyclisation of compounds of the formula:

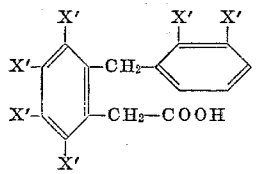

VIII in which one of the symbols X' represents halogen, alkyl, alkoxy, alkylthio or trifluoromethyl, and the other symbols X' represent hydrogen. This cyclisation is advantageously effected by heating the compounds of the Formula VIII in the presence of polyphosphoric acid or of its esters, preferably at a temperature between 60° and 180° C.

The compounds of Formula VIII may also be converted by conventional methods into the corresponding acid chlorides, whereafter the cyclisation of the latter may be effected by the Friedel-Crafts reaction, for example using aluminium chloride as catalyst in a solvent such as carbon disulphide.

The acids of the Formula VIII may be prepared by esterification of an acid of the general formula:

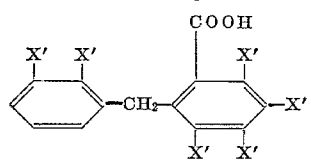

IX with methanol, followed by reduction of the ester obtained to the alcohol of the formula:

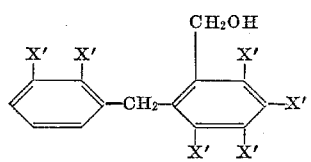

X which is treated with a halogenating agent to form the compound of the formula:

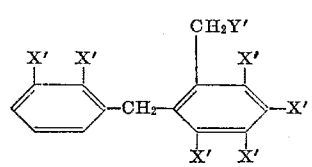

XI in which Y' represents a halogen atom, preferably chlorine, and finally by the action of an alkali metal cyanide on the compound of Formula XI followed by hydrolysis of the nitrile of the formula:

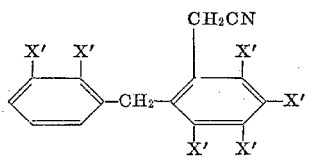

XII thus obtained.

(b) When one of the symbols X is cyano by converting a compound of Formula VII in which one of the symbols X is halogen by the application of known methods for replacing halogen substituents by cyano.

(c) When one of the symbols X is alkanesulphinyl or alkanesulphonyl by oxidation of a corresponding compound of Formula VII in which one of the symbols X represents alkylthio.

The acids of Formula IX which conform to the formula:

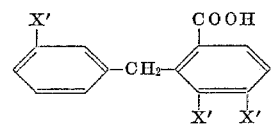

XIII in which the symbols X' are as previously defined, may be prepared by reducing ketones of the formula:

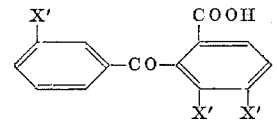

XIV

This reduction may be carried out by known methods, for example with a reducing agent such as zinc in an ammoniacal medium.

The acids of Formula IX which conform to the formula:

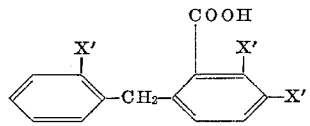

XV in which the symbols X' are as previously defined, may be prepared by reducing the phthalides of the formula:

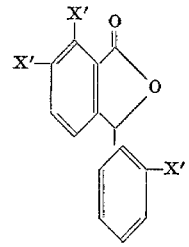

XVI

This reaction may be carried out by known methods for example with a reducing agent such as zinc in an ammoniacal medium.

The ketones of the Formula XIV and the phthalides of Formula XVI are either known per se or may be prepared by the application to appropriate starting material of methods described in the literature for the preparation of the known compounds of Formulas XIV and XVI respectively.

The term "known methods" as used herein means methods heretofore used or described in the chemical literature.

The compounds of Formula I may optionally be purified by physical methods (such as distillation, crystallisation or chromatography) or by chemical methods (such as formation of salts, crystallisation of the latter and then decomposition in an alkaline medium). In these operations, the nature of the anion of the salt is immaterial, the only necessary conditions being that the salt should be well-defined and readily crystallisable.

The compounds of Formula I and their acid addition salts and quaternary ammonium derivatives, have interesting pharmacodynamic properties. They are active on the central nervous system, acting as sedatives and tranquillisers. They also have good antihistaminic, antiserotonin, antiallergic, spasmolytic and antiemetic activity. They have given good results in physiological tests on animals in dosages of 0.1 to 10 mg. per kg. of animal weight administered by the oral route. Especially interesting are the compounds in which one of the symbols X represents chlorine, the others representing hydrogen, and R represents alkyl of 1 to 5 carbon atoms, e.g. methyl, or 4-alkoxybenzyl of 1 to 5 carbon atoms in the alkoxy radical e.g. 4-methoxybenzyl.

For medicinal use, the new compounds may be employed either as bases or as pharmaceutically acceptable acid addition salts or quaternary ammonium derivatives, i.e. salts and derivatives the anions of which are not toxic in the doses employed.

As examples of pharmaceutically acceptable acid addition salts, there may be mentioned salts of mineral acids (such as the hydrochlorides, sulphates, nitrates and phosphates) and salts of organic acids (such as the acetates, propionates, succinates, benzoates, oxalates, fumarates, maleates, theophylline-acetates, salicylates, phenolphthalinates, and methylene-bis-β-hydroxynaphthoates) or substitution derivatives of these acids.

As examples of pharmaceutically acceptable quaternary ammonium derivatives, there may be mentioned derivatives of mineral or organic acids, such as the methochlorides, methobromides, methiodides, ethochlorides, ethobromides, ethoiodides, allylchlorides, allylbromides, allyliodides, benzylchlorides, benzylbromides, benzyliodides, the methyl- and ethyl-sulphates, the benzene-sulphonates or substitution derivatives of these compounds.

The acid addition salts may be obtained by the action of the bases on acids in appropriate solvents. Suitable organic solvents, include, for example, alcohols, ethers, ketones, or chlorinated solvents. The salt formed precipitates after optional concentration of its solution and is separated by filtration or decantation.

The quarternary ammonium derivatives may be obtained by the action of the bases of Formula I on suitable reactive esters, optionally in an organic solvent, at room temperature or, more rapidly, with gentle heating.

The following examples illustrate the invention. In order to conform with International Rules, the dibenzo[a,d]cycloheptadiene nuclei are numbered as follows:

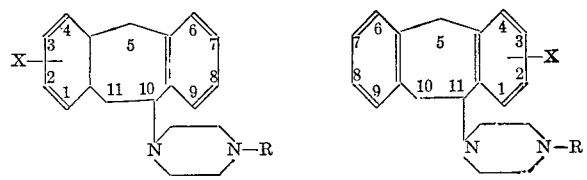

X representing a substituent.

EXAMPLE 1

To a boiling solution of 20 g. of 1-methylpiperazine in 100 cc. of anhydrous benzene is added in 7 minutes a solution of 13.15 g. of 4,10-dichlorodibenzo[a,d]cycloheptadiene in 70 cc. of anhydrous benzene. Heating under reflux is maintained for 17 hours. After cooling, the reaction mixture is treated with 200 cc. of distilled water and 350 cc. of diethyl ether. The aqueous phase is decanted and washed three times with a total of 450 cc. of diethyl ether. The combined organic solutions are washed three times to neutrality with a total of 900 cc. of distilled water, and then extracted four times with a total of 400 cc. of aqueous 2 N methanesulphonic acid solution. The combined acid solutions are washed with 100 cc. of diethyl ether and then made alkaline with 100 cc. of 10 N sodium hydroxide solution. The oil which separates out is extracted with 300 cc. of diethyl ether. The ethereal solution obtained is washed five times to neutrality with a total of 750 cc. of distilled water, dried over anhydrous potassium carbonate, and evaporated. The oily residue obtained (6.9 g.) is dissolved in 13 cc. of ethanol and treated with 23 cc. of a solution of methanesulphonic acid in ethanol (containing 2 mols of acid per litre of solution), and then with 10 cc. of anhydrous diethyl ether. After cooling for 17 hours at 3° C., the crystals which have appeared are separated, washed twice with a total of 20 cc. of ethanol, and dried under reduced pressure (20 mm. Hg). 10.65 g. of 4-chloro-10-(4-methyl - 1 - piperazinyl)dibenzo[a,d]cycloheptadiene bis-methanesulphonate, M.P. about 250° C., are obtained.

4,10-dichlorodibenzo[a,d]cycloheptadiene (M.P. 99–100° C.) employed as starting material may be prepared as follows: 2-benzoyl-3-chlorobenzoic acid (M.P. 232–233° C.) is prepared by the method of Newman et al., J. Amer. Chem. Soc. 78, 5004 (1956). 62 g. of 2-benzyl-3-chlorobenzoic acid (M.P. 149° C.) are prepared by reduction with zinc in the presence of ammonia of 86.6 g. of 2-benzoyl-3-chlorobenzoic acid. 114 g. of methyl 2-benzyl-3-chlorobenzoate (B.P. 146–151° C./0.15 mm. Hg; solidification point 36–40° C.) are prepared by the action of methanol on 125 g. of 2-benzyl-3-chlorobenzoic acid under reflux in the presence of sulphuric acid. 96 g. of 2-benzyl-3-chlorobenzyl alcohol (B.P. 157–159° C./0.1 mm. Hg) are prepared by reduction of 112 g. of methyl 2-benzyl-3-chlorobenzoate with lithium aluminium hydride in anhydrous diethyl ether. 100 g. of 2-benzyl-3-chlorobenzyl bromide (oily crude product) are prepared by the action of 48% aqueous hydrobromic acid under reflux on 83.5 g. of 2-benzyl-3-chlorobenzyl alcohol. 70.7 g. of 2-benzyl-3-chlorophenylacetonitrile (B.P. 154–156° C./0.15 mm. Hg; M.P. 56–59° C.) are prepared by the action of potassium cyanide on 99.7 g. of 2-benzyl-3-chlorobenzyl bromide, in aqueous ethanolic solution under reflux. 55 g. of 2-benzyl-3-chlorophenylacetic acid (M.P. 102° C.) are prepared by the action of potassium hydroxide, in aqueous ethanolic solution under reflux, on 64.7 g. of 2-benzyl-3-chloro-phenylacetonitrile. 39 g. of 4 - chloro-10-oxodibenzo[a,d]cycloheptadiene (M.P. 139–140° C.) are prepared by heating 45.6 g. of 2-benzyl-3-chlorophenylacetic acid in polyphosphoric acid for four hours at 110° C. 13.8 g. of 4-chloro-10-hydroxydibenzo[a,d]cycloheptadiene (M.P. 92–94° C.) are prepared by reduction of 15.8 g. of 4-chloro-10-oxodibenzo[a,d]cycloheptadiene with potassium borohydride in aqueous methanolic solution, 14 g. of 4,10-dichlorodibenzo[a,d]cycloheptadiene (M.P. 99–100° C.) are prepared by the action of thionyl chloride on 13.3 g. of 4-chloro-10-hydroxydibenzo[a,d]cycloheptadiene in solution in chloroform.

EXAMPLE 2

A benzene solution of 3,11-dichlorodibenzo[a,d]cycloheptadiene (prepared as described below from 13.6 g. of 3 - chloro-11-hydroxydibenzo[a,d]cycloheptadiene) is poured into a solution of 22.2 g. of 1-methylpiperazine in 55 cc. of dimethylformamide. The reaction mixture obtained is heated for 4 hours at 80° C. After cooling, 125 cc. of distilled water and 250 cc. of diethyl ether are added to the reaction mixture. The decanted aqueous phase is extracted three times with a total of 300 cc. of diethyl ether. The combined organic solutions are washed four times with a total of 400 cc. of distilled water, and extracted three times with a total of 510 cc. of aqueous N hydrochloric acid. The combined aqueous acid solutions are washed with 100 cc. of diethyl ether and made alkaline with 55 cc. of 10 N sodium hydroxide solution. The oil which separates out is extracted five times with a total of 1000 cc. of diethyl ether. The combined ethereal solutions are dried over anhydrous potassium carbonate and evaporated. The crystalline residue (8.4 g.) is dissolved in 160 cc. of boiling diisopropyl ether. After cooling at 5° C. for one hour, the crystals which have appeared are separated, washed with 10 cc. of diisopropyl ether and dried under reduced pressure (20 mm. Hg). 5.4 g. of 3-chloro-11-(4-methyl-1-piperazinyl)dibenzo[a,d]cycloheptadiene, M.P. 140° C., are obtained.

The initial benzene solution of 3,11-dichlorodibenzo[a,d]cycloheptadiene may be prepared in the following manner. 381 g. of 2-(3-chlorobenzoyl)benzoic acid (M.P. 160° C.) are prepared by the action of 3-chlorophenylmagnesium bromide on 254 g. of phthalic anhydride in a mixture of diethyl ether and benzene. 215.5 g. of 2-(3-chlorobenzyl)benzoic acid (M.P. 105° C.) are prepared by reduction of 251 g. of 2-(3-chlorobenzoyl)benzoic acid with powdered zinc in an ammoniacal medium. 272.3 g. of methyl 2-(3-chlorobenzyl)benzoate (B.P. 149–150° C./0.25 mm. Hg) are prepared by the action of methanol on 272 g. of 2-(3-chlorobenzyl)benzoic acid under reflux in the presence of sulphuric acid. 195.5 g. of 2-(3-chlorobenzyl)benzyl alcohol (B.P. 162–164° C./0.3 mm. Hg) are prepared by reduction with lithium aluminium hydride in anhydrous tetrahydrofuran of 272 g. of methyl 2-(3-chlorobenzyl)benzoate. 246 g. of 2-(3-chlorobenzyl)benzyl bromide (oily crude product) are prepared by the action of 48% aqueous hydrobromic acid under reflux on 195 g. of 2-(3-chlorobenzyl)benzyl alcohol. 197.5 g. of 2-(3-chlorobenzyl)phenylacetonitrile (M.P. 56–57° C.) are prepared by the action of potassium cyanide, in aqueous ethanolic medium, under reflux, on 246 g. of 2-(3-chlorobenzyl)benzyl bromide. 181.4 g. of 2-(3-chlorobenzyl)phenylacetic acid (M.P. 87–88° C.) are prepared by hydrolysis, in aqueous ethanolic medium under reflux, in the presence of potassium hydroxide, of 181 g. of 2-(3-chlorobenzyl)phenylacetonitrile. 91.6 g. of 3-chloro-11-oxodibenzo[a,d]cycloheptadiene (M.P. 130° C.) are prepared by heating 167 g. of 2-(3-chlorobenzyl)phenylacetic acid for five hours at 135° C. in polyphosphoric acid. 19.9 g. of 3-chloro-11-hydroxydibenzo[a,d]cycloheptadiene (M.P. 90° C.) are prepared by reducing 21.8 g. of 3-chloro-11-oxodibenzo[a,d]cycloheptadiene with potassium borohydride in aqueous methanolic medium. 27.6 g. of thionyl chloride are reacted with 13.6 g. of 3-chloro-11-hydroxydibenzo[a,d]cycloheptadiene in a chloroform medium, the chloroform is evaporated under reduced pressure (20 mm. Hg), the residue is dissolved in 100 cc. of chloroform, the chloroform is again evaporated, and the crystallised residue is dissolved in 30 cc. of benzene.

EXAMPLE 3

A benzene solution of 3,11-dichlorodibenzol[a,d]cycloheptadiene (prepared from 18.5 g. of 3-chloro-11-hydroxydibenzo[a,d]cycloheptadiene, by the procedure described in Example 2) is poured in 25 minutes into a boiling solution of 51.5 g. of 1-(4-methoxybenzyl)piperazine in 250 cc. of benzene. The reflux is continued for 6 hours. After cooling, the reaction mixture is treated with 400 cc. of distilled water and 100 cc. of diethyl ether. The organic solution is separated and washed ten times with a total of 3300 cc. of distilled water and then extracted three times with a total of 450 cc. of an aqueous N methanesulphonic acid solution. The combined acid solutions are washed with 200 cc. of diethyl ether and then made alkaline with 100 cc. of 10 N sodium hydroxide solution. The oil which separates out is extracted twice with a total of 500 cc. of diethyl ether. The combined ethereal solutions are washed twice with a total 500 cc. of distilled water, dried over anhydrous potassium carbonate and evaporated. The residue is dissolved in 20 cc. of boiling acetonitrile. After cooling for 17 hours at 3° C., the crystals which have appeared are separated, washed twice with a total of 9 cc. of ice-cold acetonitrile, and dried under reduced pressure (20 mm. Hg). 6.6 g. of 3-chloro-11-[4-(4-methoxybenzyl)-1-piperazinyl]dibenzo[a,d]cycloheptadiene, M.P. 118–119° C., are obtained.

EXAMPLE 4

A benzene solution of 3,10-dichlorodibenzo[a,d]cycloheptadiene (prepared as described below from 22.5 g. of 3 - chloro - 10 - hydroxydibenzo[a,d]cycloheptadiene) is poured in 30 minutes into a boiling solution of 36.8 g. of 1-methylpiperazine in 180 cc. of benzene. The reflux is maintained for five hours. After cooling, 400 cc. of distilled water and 100 cc. of diethyl ether are added to the reaction mixture. The aqueous solution is separated and extracted four times with a total of 400 cc. of diethyl ether. The combined organic solutions are washed four times with a total of 200 cc. of distilled water and then extracted five times with a total of 600 cc. of an aqueous 2 N methanesulphonic acid solution. The combined aqueous acid solutions are washed twice with a total of 100 cc. of diethyl ether and then made alkaline with 200 cc. of 10 N sodium hydroxide solution. The oil which separates out is extracted five times with a total of 600 cc. of diethyl ether. The combined ethereal solutions are washed four times with a total of 320 cc. of distilled water, dried over anhydrous potassium carbonate, and evaporated. The residue (12.45 g.) is dissolved in 40 cc. of boiling diisopropyl ether. After cooling for four hours at 3° C., the crystals which have appeared are separated, washed twice with a total of 8 cc. of ice-cold diisopropyl ether and dried under reduced pressure (20 mm. Hg). 9.9 g. of 3-chloro-10 - (4 - methyl - 1 - piperazinyl)dibenzo[a,d]cycloheptadiene, M.P. 108–109° C., are obtained.

The initial 3,10-dichlorodibenzo[a,d]cycloheptadiene solution may be prepared as follows. 63.8 g. of methyl 2-benzyl-4-chlorobenzoate (B.P. 147–152° C./0.3 mm. Hg) are prepared by the action of methanol, under reflux in the presence of sulphuric acid, on 74.5 g. of 2-benzyl-4-chlorobenzoic acid [described by Vingiello et al., J. Org. Chem. 23, 1786 (1958), M.P. 146–148° C.]. 52.5 g. of 2-benzyl-4-chlorobenzyl alcohol (B.P. 153–155° C./0.15 mm. Hg) are prepared by reduction of 63.7 g. of methyl 2-benzyl-4-chlorobenzoate with lithium aluminium in anhydrous diethyl ether. 57.6 g. of 2-benzyl-4-chlorobenzyl bromide (B.P. 148.5–150° C./0.15 mm. Hg) are prepared by the action of 48% aqueous hydrobromic acid under reflux on 52.3 g. of 2-benzyl-4-chlorobenzyl alcohol. 40.7 g. of (2-benzyl-4-chlorophenyl)acetonitrile (B.P. 151–152.5° C./0.05 mm. Hg; M.P. 74–76° C.) are prepared by the action of potassium cyanide in aqueous ethanolic medium under reflux on 57.2 g. of 2-benzyl-4-chlorobenzyl bromide. 36.5 g. of (2-benzyl-4-chlorophenyl)acetic acid (M.P. 157–158° C.) are prepared by hydrolysis of 40.7 g. of (2-benzyl-4-chlorophenyl)acetonitrile in aqueous ethanolic medium under reflux in the presence of potassium hydroxide. 25.9 g. of 3-chloro-10-oxodibenzo[a,d]cycloheptadiene (M.P. 96–97° C.) are prepared by heating 36.4 g. of (2-benzyl-4-chlorophenyl)acetic acid for seven hours at 105–110° C. in polyphosphoric acid. 22.5 g. of 3-chloro10-hydroxydibenzo[a,d]cycloheptadiene (M.P. 125.5–126° C.) are prepared by reduction of 22.5 g. of 3-chloro-10-oxodibenzo[a,d]cycloheptadiene with potassium borohydride in aqueous methanolic medium. 22 g. of thionyl chloride are reacted with 22.5 g. of 3-chloro-10-hydroxydibenzo[a,d]cycloheptadiene in chloroform, the chloroform is then evaporated under reduced pressure (20 mm. Hg), the residue is dissolved in 120 cc. of anhydrous benzene, the benzene is evaporated, and the crystallised residue is dissolved in 140 cc. of anhydrous benzene.

EXAMPLE 5

A benzene solution of 2,10-dichlorodibenzo[a,d]cycloheptadiene (prepared as described below from 17.4 g. of 2 - chloro - 10 - hydroxydibenzo[a,d]cycloheptadiene) is poured in 35 minutes into a boiling solution of 28.4 g. of 1-methylpiperazine in 130 cc. of benzene. The reflux is continued for 5 hours. After cooling, the reaction mixture is treated with 650 cc. of distilled water and 250 cc. of diethyl ether. The aqueous solution is separated and washed three times with a total of 750 cc. of diethyl ether. The combined organic solutions are washed twice with a total of 150 cc. of distilled water and then extracted four times with a total of 1000 cc. of an aqueous 2 N methanesulphonic acid solution. The combined aqueous acid solutions are washed three times with a total of 225 cc. of diethyl ether and made alkaline with 450 cc. of 10 N sodium hydroxide solution. The oil which separates out is extracted three times with a total of 750 cc. of diethyl ether. The combined ethereal solutions are washed six times wtih a total of 450 cc. of distilled water and then dried over anhydrous magnesium sulphate and evaporated. The residue (7.1 g.) is dissolved in 28 cc. of boiling acetonitrile. After cooling for two hours at 3° C., the crystals which have appeared are separated, washed twice with a total of 6 cc. of ice-cold acetonitrile and dried under reduced pressure (20 mm. Hg). 6.7 g. of 2-chloro-10-(4 - methyl - 1 - piperazinyl)dibenzo[a,d]cycloheptadiene, M.P. 127–129° C., are obtained.

The initial benzene solution of 2,10-dichlorodibenzo [a,d]cycloheptadiene may be prepared in the following manner. 2-formyl-5-chlorobenzoic acid (M.P. 140° C.) is prepared by the method of Vaughan et al., J. Amer. Chem. Soc. 68, 1314 (1946). 97.4 g. of 3-phenyl-6-chlorophthalide (M.P. 93.5–94.5° C.) are prepared by the action of phenylmagnesium bromide in tetrahydrofuran on 101.2 g. of 2-formyl-5-chlorobenzoic acid. 33.4 g. of 2-benzyl-5-chlorobenzoic acid (M.P. 128–129° C.) are prepared by reduction of 37.2 g. of 3-phenyl-6-chlorophthalide with powdered zinc in an ammoniacal medium. 122.2 g. of methyl 2-benzyl-5-chlorobenzoate (B.P. 155–157.5° C./ 0.2 mm. Hg) are prepared by the action of methanol, under reflux in the presence of sulphuric acid, and 125 g. of 2-benzyl-5-chlorobenzoic acid. 101.7 g. of 2-benzyl-5-chlorobenzyl alcohol (B.P. 146–148° C./0.15 mm. Hg) are prepared by reduction of 122 g. of methyl 2-benzyl-5-chlorobenzoate with lithium aluminium hydride. 119.7 g. of 2-benzyl-5-chlorobenzyl bromide (B.P. 139–142.5° C./ 0.3 mm. Hg; M.P. 52° C.) are prepared by the action of 48% aqueous hydrobromic acid under reflux on 101.5 g. of 2-benzyl-5-chlorobenzyl alcohol. 89.2 g. of (2-benzyl-5-chlorophenyl)acetonitrile (B.P. 141–143° C./0.25 mm. Hg; M.P. 35° C.) are prepared by the action of potassium cyanide, in aqueous ethanolic medium under reflux, on 119.2 g. of 2-benzyl-5-chlorobenzyl bromide. 86 g. of (2-benzyl-5-chlorophenyl)acetic acid (M.P. 114.5–116° C.) are prepared by hydrolysis of 89.1 g. of (2-benzyl-5-chlorophenyl)acetonitrile in aqueous ethanolic medium under reflux in the presence of potassium hydroxide. 48.6 g. of 2-chloro-10-oxodibenzo[a,d]cycloheptadiene (M.P. 146–147° C.) are prepared by heating 62.2 g. of (2-benzyl-5-chlorophenyl)acetic acid in polyphosphoric acid at 130–135° C. for five hours. 24.7 g. of 2-chloro-10-hydroxydibenzo[a,d]cycloheptadiene (M.P. 122–123° C.) are prepared by reduction of 27 g. of 2-chloro-10-oxodibenzo[a,d]cycloheptadiene with potassium borohydride in aqueous methanolic medium. 26.9 g. of thionyl chloride are reacted with 17.4 g. of 2-chloro-10-hydroxydibenzo[a,d]cycloheptadiene in chloroform, followed by evaporation of the chloroform under reduced pressure (20 mm. Hg), redissolution of the residue in 105 cc. of anhydrous benzene, evaporation of the benzene under reduced pressure, and dissolution of the crystallised residue in 95 cc. of anhydrous benzene.

EXAMPLE 6

A benzene solution of 4,11-dichlorodibenzo[a,d]cycloheptadiene (prepared as described below from 7.6 g. of 4 - chloro - 11 - hydroxydibenzo[a,d]cycloheptadiene) is poured in seven minutes into a boiling solution of 12 g. of 1-methylpiperazine in 100 c. of benzene. The reflux is continued for eight hours. After cooling, the reaction mixture is treated with 400 cc. of distilled water, 5 cc. of 10 N sodium hydroxide solution and 100 cc. of diethyl ether. The decanted aqueous solution is washed three times with a total of 300 cc. of diethyl ether. The combined organic solutions are washed twice with a total of 100 cc. of distilled water and extracted three times with a total of 150 cc. of an aqueous 2 N methanesulphonic acid solution. The combined aqueous acid solutions are made alkaline with 30 cc. of 10 N sodium hydroxide solution. The oil which separates out is extracted three times with a total of 600 cc. of diethyl ether. The combined ethereal solutions are washed to neutrality with distilled water (550 cc. in all), dried over anhydrous potassium carbonate, and evaporated. The residue (2.2 g.), in solution in 14 cc. of anhydrous ethanol, is treated with 3.9 cc. of an anhydrous solution of hydrogen chloride in ethanol (containing 3.05 mols of hydrogen chloride per litre of solution). After cooling for three hours at 3° C., the crystals which have appeared are separated, washed three times with a total of 15 cc. of ice-cold ethanol, and dried under reduced pressure (20 mm. Hg). 2.3 g. of 4-chloro-11-(4-methyl-1 - piperazinyl)dibenzo[a,d]cycloheptadiene dihydrochloride, M.P. about 215° C., are obtained.

The initial benzene solution of 4,11-dichlorodibenzo-[a,d]cycloheptadiene may be prepared as follows. 59.1 g. of 3-(2-chlorophenyl)phthalide (M.P. 111–112° C.) are prepared by the action of 2-(chlorophenyl)magnesium bromide in tetrahydrofuran on 82.5 g. of 2-formylbenzoic acid. 82.6 g. of 2-(2-chlorobenzyl)benzoic acid (M.P. 133° C.) are prepared by reduction of 87 g. of 3-(2-chlorophenyl)phthalide with powdered zinc in an ammoniacal medium. 88.7 g. of methyl 2-(2-chlorobenzyl)benzoate (B.P. 140–145° C./0.1 mm. Hg) are prepared by the action of methanol under reflux in the presence of sulphuric acid on 94 g. of 2-(2-chlorobenzyl)benzoic acid. 29.9 g. of 2-(2-chlorobenzyl)benzyl alcohol (M.P. 75–76° C.) are prepared by reduction of 34.6 g. of methyl 2-(2-chlorobenzyl)benzoate with lithium aluminium hydride in anhydrous diethyl ether. 85.7 g. of 2-(2-chlorobenzyl)benzyl bromide (B.P. 138–140° C./0.05 mm. Hg) are prepared by the action of 48% aqueous hydrobromic acid under reflux on 78 g. of 2-(2-chlorobenzyl)benzyl alcohol. 21 g. of [2-(2-chlorobenzyl)phenyl]acetonitrile (M.P. 64° C.) are prepared by the action of potassium cyanide on 30.5 g. of 2-(2-chlorobenzyl)benzyl bromide in aqueous ethanolic medium under reflux. 40.9 g. of [2-(2-chlorobenzyl)phenyl]acetic acid (M.P. 102° C.) are prepared by hydrolysis of 41 g. of [2-(2-chlorobenzyl)phenyl]acetonitrile in aqueous ethanolic medium under reflux in the presence of potassium hydroxide. 14 g. of crude [2-(2-chlorobenzyl)phenyl]acetyl chloride are prepared by the action of 6.3 g. of thionyl chloride on 13 g. of [2-(2-chlorobenzyl)phenyl]acetic acid in benzene solution. 8.8 g. of 4-chloro-11-oxodibenzo[a,d]cycloheptadiene (M.P. 112° C.) are prepared by the action of aluminium chloride on 13.6 g. of [2-(2-chlorobenzyl)-phenyl]acetyl chloride in solution in carbon disulphide. 11.6 g. of 4-chloro-11-hydroxydibenzo[a,d]cycloheptadiene (M.P. 122° C.) are prepared by reducing 13.35 g. of 4-chloro-11-oxodibenzo[a,d]cycloheptadiene with potassium borohydride in aqueous methanolic medium. 7.1 g. of thionyl chloride are reacted with 7.6 g. of 4-chloro-11-hydroxydibenzo[a,d]cycloheptadiene in chloroform, followed by evaporation of the chloroform under reduced pressure (20 mm. Hg), redissolution of the residue in 25 cc. of anhydrous benzene, evaporation of the benzene under reduced pressure, and dissolution of the crystallized residue in 100 cc. of anhydrous benzene.

EXAMPLE 7

A benzene solution of 1,10-dichlorodibenzo[a,d]cycloheptadiene (prepared as described below from 20 g. of 1 - chloro - 10 - hydroxydibenzo[a,d]cycloheptadiene) is poured in 30 minutes into a boiling solution of 32.8 g. of 1-methylpiperazine in 150 cc. of benzene. The reflux is continued for five hours. After cooling, the reaction mixture is treated with 750 cc. of distilled water, 5 cc. of 10 N sodium hydroxide solution and 250 cc. of diethyl ether. The decanted aqueous solution is washed three times with a total of 450 cc. of diethyl ether. The combined organic solutions are washed to neutrality with distilled water (1500 cc. in all) and then extracted three times with a total of 150 cc. of an aqueous 2 N methanesulphonic acid solution. The combined aqueous acid solutions are made alkaline with 75 cc. of 5 N sodium hydroxide solution. The oil which separates out is extracted three times with a total of 450 cc. of diethyl ether. The combined ethereal solutions are washed four times with a total of 200 cc. of distilled water, dried over anhydrous potassium carbonate, and evaporated The residue (3.6 g.) is dissolved in 15 cc. of boiling ethanol. After cooling for one hour at 5° C., the crystals which have appeared are separated, washed twice with a total of 3 cc. of ice-cold ethanol and dried under reduced pressure (20 mm. Hg). 3.2 g. of 1-chloro-10-(4-methyl - 1 - piperazinyl)dibenzo[a,d]cycloheptadiene, M.P. 135° C., are obtained.

The initial benzene solution of 1,10-dichlorodibenzo[a,d]cycloheptadiene may be prepared in the following manner. 156 g. of 3-bromo-7-chlorophthalide (M.P. 93° C.) are prepared by the action of bromine on 147 g. of 7-chlorophthalide (described by Bird et al., J. Chem. Soc., p. 5050 (1952)). 73.4 g. of 2-formyl-6-chlorobenzoic acid (M.P. 183–184° C.) are prepared by alkaline hydrolysis of 104 g. of 3-bromo-7-chlorophthalide. 109.8 g. of 3-phenyl-7-chlorophthalide (M.P. 88° C.) are prepared by the action of phenyl-magnesium bromide, in anhydrous tetrahydrofuran, on 100 g. of 2-formyl-6-chlorobenzoic acid. 76 g. of 2-benzyl-6-chlorobenzoic acid (M.P. 133–134° C.) are prepared by reduction of 88 g. of 3-phenyl-7-chlorophthalide with iodine and red phosphorus in acetic acid. 105 g. of methyl 2-benzyl-6-chlorobenzoate (B.P. 141 to 150° C./0.15 mm. Hg) are prepared by the action of diazomethane in ethereal solution on 106 g. of 2-benzyl-6-chlorobenzoic acid. 93 g. of 2-benzyl-6-chlorobenzyl alcohol (M.P. 65–66° C.) are prepared by reduction of 105 g. of methyl 2-benzyl-6-chlorobenzoate with lithium aluminium hydride in anhydrous diethyl ether. 113.4 g. of 2-benzyl-6-chlorobenzyl bromide (B.P. 135–144° C./0.1 mm. Hg) are prepared by the action of 48% aqueous hydrobromic acid under reflux on 93 g. of 2-benzyl-6-chlorobenzyl alcohol. 78.4 g. of (2-benzyl-6-chlorophenyl)acetonitrile (B.P. 145–162° C./0.1 mm. Hg) are prepared by the action of potassium cyanide in aqueous ethanolic medium under reflux, on 113 g. of 2-benzyl-6-chlorobenzyl bromide. 77.5 g. of (2-benzyl-6-chlorophenyl)acetic acid (M.P. 132° C.) are prepared by hydrolysis of 83.6 g. of (2-benzyl-6-chlorophenyl)acetonitrile in aqueous ethanolic medium under reflux in the presence of potassium hydroxide. 44.4 g. of 1-chloro-10-oxodibenzo[a,d]cycloheptadiene (M.P. 142° C.) are prepared by heating 61.6 g. of (2-benzyl-6-chlorophenyl)acetic acid in polyphosphoric acid at 130° C. for 75 minutes. 20.1 g. of 1-chloro-10 - hydroxydibenzo[a,d]cycloheptadiene (M.P. 128° C.) are prepared by reduction of 24.5 g. of 1-chloro-10-oxodibenzo[a,d]cycloheptadiene with potassium borohydride in aqueous methanol. 19.6 g. of thionyl chloride are reacted with 20 g. of 1-chloro-10-hydroxydibenzo[a,d]cycloheptadiene in chloroform, followed by evaporation of the chloroform under reduced pressure (20 mm. Hg) redissolution of the residue in 200 cc. of anhydrous benzene, evaporation of the benzene under reduced pressure, and dissolution of the residue in 100 cc. of benzene.

The invention includes within its scope pharmaceutical compositions comprising, in association with a pharmaceutically acceptable carrier or coating, at least one dibenzo[a,d]cycloheptadiene derivative of Formula I or acid addition salt or quaternary ammonium derivative thereof. These compositions may be in a form suitable for oral, parenteral or rectal administration.

Solid compositions for oral administration include tablets, pills, powders and granules. In such solid compositions, the active compound is mixed with one or more inert diluents, such as sucrose, lactose or starch. These compositions may also comprise, as is normal practice, substances other than diluents, e.g. lubricants, such as magnesium stearate.

Liquid compositions for oral administration include pharmaceutically acceptable emulsions, solutions, suspensions, syrups and elixirs containing inert diluents, such as water or paraffin oil. These compositions may also comprise substances other than diluents, for example wetting agents, sweetening agents, perfumes and preservatives.

The compositions of the invention for parenteral administration may be aqueous or non-aqueous sterile solutions, suspensions, or emulsions. As solvent or vehicle, there may be employed propylene glycol, polyethylene glycol, vegetable oils, especially olive oil, and injectable organic esters, for example ethyl oleate. These compositions may also contain adjuvants, more particularly wetting, emulsifying and dispersing agents. The sterilisation may be carried out in various ways, for example, with the aid of a bacteriological filter, by incorporating sterilising agents in the composition, by irradiation, or by heating. The compositions may also be prepared in the form of sterile solid compositions which may be dissolved at the moment of use in sterile water or any other sterile injectable medium.

Compositions for rectal administration are suppositories which contain, in addition to the active compound, excipients such as cocoa butter or suppository wax.

The dose employed depends upon the desired therapeutic effect, the route of administration, and the duration of treatment. When orally administered, generally between 5 and 500 mg. of active product per day for an adult is administered.

The following examples illustrate compositions in accordance with the invention.

EXAMPLE A

By the usual method, tablets having the following composition are prepared:

|  | Mg. |
|---|---|
| 4-chloro - 11-(4 - methyl-1 - piperazinyl)dibenzo [a,d]-cycloheptadiene, dihydrochloride | 6.3 |
| Starch | 108.7 |
| Colloidal silica | 32 |
| Magnesium stearate | 3 |

EXAMPLE B

Tablets having the following composition are prepared by the usual method:

|  | Mg. |
|---|---|
| 3-chloro - 11-(4 - methyl - 1 - piperazinyl)dibenzo [a,d]-cycloheptadiene | 5 |
| Starch | 110 |
| Colloidal silica | 32 |
| Magnesium stearate | 3 |

EXAMPLE C

Tablets having the following composition are prepared by the usual method:

|  | Mg. |
|---|---|
| 1-chloro - 10-(4 - methyl - 1-piperazinyl)dibenzo [a,d]-cycloheptadiene | 5 |
| Starch | 110 |
| Colloidal silica | 32 |
| Magnesium stearate | 3 |

I claim:
1. A dibenzo[a,d]cycloheptadiene of the formula:

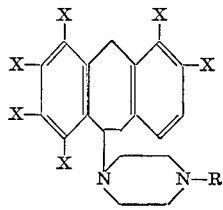

and its non-toxic addition salts in which one of the symbols X is halogen, and the other symbols X are all hydrogen: R is alkyl of 1 to 5 carbon atoms, the phenylalkyl of 1 to 5 carbon atoms in the alkyl, or phenylalkyl of 1 to 5 carbon atoms in the alkyl substituted on the phenyl by alkoxy of 1 to 5 carbon atoms, and each carbon atom of the piperazine may be substituted by one methyl.

2. A dibenzo[a,d]cycloheptadiene as claimed in claim 1 and its non-toxic acid addition salts wherein one of the symbols X is chlorine and the other symbols X are all hydrogen; and R is alkyl of 1 to 5 carbon atoms or 4-alkoxybenzyl of 1 to 5 carbon atoms in the alkoxy residue.

3. A dibenzo[a,d]cycloheptadiene as claimed in claim 1 being 4-chloro - 10-(4-methyl - 1-piperazinyl)dibenzo [a,d]cycloheptadiene and its non-toxic acid addition salts.

4. A dizenzo[a,d]cycloheptadiene as claimed in claim 1 being 3 - chloro-11-(4 - methyl-1-piperazinyl)dibenzo [a,d]cycloheptadiene and its non-toxic acid addition salts.

5. A dibenzo[a,d]cycloheptadiene as claimed in claim 1 being 3 - chloro-11 - [4-(4-methoxybenzyl) - 1-piperazinyl]dibenzo - [a,d]cycloheptadiene and its non-toxic acid addition salts.

6. A dibenzo[a,d]cycloheptadiene as claimed in claim 1 being 3 - chloro-10-(4 - methyl-1-piperazinyl)dibenzo [a,d]cycloheptadiene and its non-toxic acid addition salts.

7. A dibenzo[a,d]cycloheptadiene as claimed in claim 1 being 2 - chloro-10 - (4-methyl-1-piperazinyl)dibenzo [a,d]cycloheptadiene and its non-toxic acid addition salts.

8. A dibenzo[a,d]cycloheptadiene as claimed in claim 1 being 4 - chloro-11 - (4-methyl-1 - piperazinyl)dibenzo [a,d] - cycloheptadiene and its non-toxic acid addition salts.

9. A dibenzo[a,d]cycloheptadiene as claimed in claim 1 being 1 - chloro-10 - (4-methyl-1 - piperazinyl) dibenzo [a,d]cycloheptadiene and its non-toxic acid addition salts.

References Cited
UNITED STATES PATENTS

| | | | |
|---|---|---|---|
| 3,052,721 | 9/1962 | Bernstein et al. | 260—268 X |
| 3,167,541 | 1/1965 | Van der Stelt | 260—268 X |
| 3,257,404 | 6/1966 | Fouché | 260—268 |

DONALD G. DAUS, Primary Examiner

U.S. Cl. X.R.

260—256, 343.3, 456, 465, 516, 520, 590, 609, 618, 690; 424—250